(12) United States Patent
Hall et al.

(10) Patent No.: US 7,291,303 B2
(45) Date of Patent: Nov. 6, 2007

(54) METHOD FOR BONDING A TRANSMISSION LINE TO A DOWNHOLE TOOL

(75) Inventors: David R. Hall, Provo, UT (US); Joe Fox, Spanish Fork, UT (US)

(73) Assignee: IntelliServ, Inc., Provo, UT (US)

( * ) Notice: Subject to any disclaimer, the term of this patent is extended or adjusted under 35 U.S.C. 154(b) by 341 days.

(21) Appl. No.: 10/707,673

(22) Filed: Dec. 31, 2003

(65) Prior Publication Data

US 2007/0169929 A1   Jul. 26, 2007

(51) Int. Cl.
*E21B 17/00* (2006.01)
(52) U.S. Cl. .............................. 264/272.11; 166/242.1; 175/40; 175/320
(58) Field of Classification Search ................ 166/378, 166/242.1, 242.2, 241.2, 65.1, 242.6; 175/40, 175/325.1, 104, 320; 340/854.4; 174/28, 174/47, 75 R–75 C; 439/191, 194, 195; 285/333; 324/347; 336/90, 92; 264/272.11, 264/272.15
See application file for complete search history.

(56) References Cited

U.S. PATENT DOCUMENTS

| | | | |
|---|---|---|---|
| 749,633 A | 1/1904 | Seeley | |
| 2,151,206 A | * 3/1939 | Hawthorn | 174/28 |
| 2,178,931 A | 11/1939 | Crites et al. | |
| 2,197,392 A | * 4/1940 | Hawthorn | 174/98 |
| 2,249,769 A | 7/1941 | Leonardon | |
| 2,301,783 A | 11/1942 | Lee | |
| 2,354,887 A | 8/1944 | Silverman et al. | |
| 2,379,800 A | 7/1945 | Hare | |
| 2,414,719 A | 1/1947 | Cloud | |
| 2,531,120 A | 11/1950 | Feaster | |
| 2,633,414 A | 3/1953 | Boivinet | |
| 2,659,773 A | 11/1953 | Barney | |
| 2,662,123 A | 12/1953 | Koenig, Jr. | |
| 2,748,358 A | 5/1956 | Johnston | |
| 2,974,303 A | 3/1961 | Dixon | |
| 2,982,360 A | 5/1961 | Morton et al. | |
| 3,079,549 A | 2/1963 | Martin | |

(Continued)

FOREIGN PATENT DOCUMENTS

EP   0399987 A1   11/1990

(Continued)

*Primary Examiner*—Lanna Mai
*Assistant Examiner*—Matthew J. Smith
(74) *Attorney, Agent, or Firm*—Tyson J. Wilde; Jeffery E. Daly; Daniel P. Nelson

(57) ABSTRACT

An apparatus for bonding a transmission line to the central bore of a downhole tool includes a pre-formed interface for bonding a transmission line to the inside diameter of a downhole tool. The pre-formed interface includes a first surface that substantially conforms to the outside contour of a transmission line and a second surface that substantially conforms to the inside diameter of a downhole tool. In another aspect of the invention, a method for bonding a transmission line to the inside diameter of a downhole tool includes positioning a transmission line near the inside wall of a downhole tool and placing a mold near the transmission line and the inside wall. The method further includes injecting a bonding material into the mold and curing the bonding material such that the bonding material bonds the transmission line to the inside wall.

14 Claims, 12 Drawing Sheets

U.S. PATENT DOCUMENTS

| | | | |
|---|---|---|---|
| 3,090,031 A | 5/1963 | Lord | |
| 3,170,137 A | 2/1965 | Brandt | |
| 3,186,222 A | 6/1965 | Martin | |
| 3,194,886 A | 7/1965 | Mason | |
| 3,209,323 A | 9/1965 | Grossman, Jr. | |
| 3,227,973 A | 1/1966 | Gray | |
| 3,253,245 A | 5/1966 | Brandt | |
| 3,518,608 A | 6/1970 | Papadopoulos | |
| 3,696,332 A | 10/1972 | Dickson, Jr. et al. | |
| 3,793,632 A | 2/1974 | Still | |
| 3,807,502 A | 4/1974 | Heilhecker et al. | |
| 3,879,097 A | 4/1975 | Oertle | |
| 3,930,220 A | 12/1975 | Shawhan | |
| 3,957,118 A | 5/1976 | Barry et al. | |
| 3,989,330 A | 11/1976 | Cullen et al. | |
| 4,012,092 A | 3/1977 | Godbey | |
| 4,087,781 A | 5/1978 | Grossi et al. | |
| 4,095,865 A | 6/1978 | Denison et al. | |
| 4,121,193 A | 10/1978 | Denison | |
| 4,126,848 A | 11/1978 | Denison | |
| 4,215,426 A | 7/1980 | Klatt | |
| 4,220,381 A | 9/1980 | Van der Graaf | |
| 4,348,672 A | 9/1982 | Givler | |
| 4,445,734 A | 5/1984 | Cunningham | |
| 4,496,203 A | 1/1985 | Meadows | |
| 4,537,457 A | 8/1985 | Davis, Jr. et al. | |
| 4,578,675 A | 3/1986 | Macleod | |
| 4,605,268 A | 8/1986 | Meador | |
| 4,660,910 A | 4/1987 | Sharp et al. | |
| 4,683,944 A | 8/1987 | Curlett | |
| 4,698,631 A | 10/1987 | Kelly, Jr. et al. | |
| 4,722,402 A | 2/1988 | Weldon | |
| 4,785,247 A | 11/1988 | Meador et al. | |
| 4,787,450 A * | 11/1988 | Andersen et al. | 166/267 |
| 4,788,544 A | 11/1988 | Howard | |
| 4,806,928 A | 2/1989 | Veneruso | |
| 4,884,071 A | 11/1989 | Howard | |
| 4,901,069 A | 2/1990 | Veneruso | |
| 4,914,433 A | 4/1990 | Galle | |
| 4,924,949 A | 5/1990 | Curlett | |
| 5,008,664 A | 4/1991 | More et al. | |
| 5,052,941 A | 10/1991 | Hernandez-Marti et al. | |
| 5,148,408 A | 9/1992 | Matthews | |
| 5,248,857 A | 9/1993 | Ollivier | |
| 5,278,550 A | 1/1994 | Rhein-Knudsen et al. | |
| 5,302,138 A | 4/1994 | Shields | |
| 5,311,661 A | 5/1994 | Zifferer | |
| 5,332,049 A | 7/1994 | Tew | |
| 5,334,801 A | 8/1994 | Mohn | |
| 5,371,496 A | 12/1994 | Tanamachi | |
| 5,454,605 A | 10/1995 | Mott | |
| 5,455,573 A | 10/1995 | Delatorre | |
| 5,505,502 A | 4/1996 | Smith et al. | |
| 5,517,843 A | 5/1996 | Winship | |
| 5,521,592 A | 5/1996 | Veneruso | |
| 5,568,448 A | 10/1996 | Tanigushi et al. | |
| 5,650,983 A | 7/1997 | Kondo et al. | |
| 5,691,712 A | 11/1997 | Meek et al. | |
| 5,743,301 A | 4/1998 | Winship | |
| RE35,790 E | 5/1998 | Pustanyk et al. | |
| 5,810,401 A | 9/1998 | Mosing et al. | |
| 5,833,490 A | 11/1998 | Bouldin | |
| 5,853,199 A | 12/1998 | Wilson | |
| 5,856,710 A | 1/1999 | Baughman et al. | |
| 5,898,408 A | 4/1999 | Du | |
| 5,908,212 A | 6/1999 | Smith et al. | |
| 5,924,499 A | 7/1999 | Birchak et al. | |
| 5,942,990 A | 8/1999 | Smith et al. | |
| 5,955,966 A | 9/1999 | Jeffryes et al. | |
| 5,959,547 A | 9/1999 | Tubel et al. | |
| 5,971,072 A | 10/1999 | Huber et al. | |
| 6,030,004 A | 2/2000 | Schnock et al. | |
| 6,041,872 A | 3/2000 | Holcomb | |
| 6,045,165 A | 4/2000 | Sugino et al. | |
| 6,046,685 A | 4/2000 | Tubel | |
| 6,057,784 A | 5/2000 | Schaaf et al. | |
| 6,104,707 A | 8/2000 | Abraham | |
| 6,108,268 A | 8/2000 | Moss | |
| 6,123,561 A | 9/2000 | Turner et al. | |
| 6,141,763 A | 10/2000 | Smith et al. | |
| 6,173,334 B1 | 1/2001 | Matsuzaki et al. | |
| 6,177,882 B1 | 1/2001 | Ringgenberg et al. | |
| 6,223,826 B1 | 1/2001 | Chau et al. | |
| 6,188,223 B1 | 2/2001 | van Steenwyk et al. | |
| 6,196,335 B1 | 3/2001 | Rodney | |
| 6,209,632 B1 | 4/2001 | Holbert et al. | |
| 6,367,565 B1 | 4/2002 | Hall | |
| 6,392,317 B1 | 5/2002 | Hall et al. | |
| 6,405,795 B2 | 6/2002 | Holbert et al. | |
| 6,641,434 B2 | 11/2003 | Boyle et al. | |
| 6,655,464 B2 | 12/2003 | Chau et al. | |
| 6,670,880 B1 * | 12/2003 | Hall et al. | 336/132 |
| 6,789,621 B2 * | 9/2004 | Wetzel et al. | 166/253.1 |
| 6,817,410 B2 * | 11/2004 | Wetzel et al. | 166/233 |
| 7,064,676 B2 * | 6/2006 | Hall et al. | 340/853.1 |
| 2002/0135179 A1 | 9/2002 | Boyle et al. | |
| 2002/0193004 A1 | 12/2002 | Boyle et al. | |
| 2003/0070842 A1 | 4/2003 | Bailey et al. | |
| 2003/0213598 A1 | 11/2003 | Hughes | |

FOREIGN PATENT DOCUMENTS

| | | |
|---|---|---|
| WO | 8801096 | 2/1988 |
| WO | 9014497 | 11/1990 |

* cited by examiner

METHOD FOR BONDING A TRANSMISSION LINE TO A DOWNHOLE TOOL

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

1. Field of the Invention

This invention relates to oil and gas drilling, and more particularly to apparatus and methods for reliably transmitting information along downhole drilling strings.

2. Background

In the downhole drilling industry, MWD and LWD tools are used to take measurements and gather information with respect to downhole geological formations, status of downhole tools, conditions located downhole, and the like. Such data is useful to drill operators, geologists, engineers, and other personnel located at the surface. This data may be used to adjust drilling parameters, such as drilling direction, penetration speed, and the like, to accurately tap into oil, gas, or other mineral bearing reservoirs. Data may be gathered at various points along the drill string. For example, sensors, tools, and the like, may be located at or near the bottom hole assembly and on intermediate tools located at desired points along the drill string.

Nevertheless, data gathering and analysis do not represent the entire process. Once gathered, apparatus and methods are needed to rapidly and reliably transmit the data to the earth's surface. Traditionally, technologies such as mud pulse telemetry have been used to transmit data to the surface. However, most traditional methods are limited to very slow data rates and are inadequate for transmitting large quantities of data at high speeds.

In order to overcome these limitations, various efforts have been made to transmit data along electrical or other types of cable integrated directly into drill string components, such as sections of drill pipe. In such systems, electrical contacts or other transmission elements are used to transmit data across tool joints or connection points in the drill string. Nevertheless, many of these efforts have been largely abandoned or frustrated due to unreliability and complexity.

For example, one challenge is effectively integrating a transmission line into a downhole tool, such as a section of drill pipe. Due to the inherent nature of drilling, most downhole tools have a similar cylindrical shape defining a central bore. The wall thickness surrounding the central bore is typically designed in accordance with weight, strength, and other constraints imposed by the downhole environment. In some cases, milling or forming a channel in the wall of the downhole tool to accommodate a transmission line may excessively weaken the wall. Thus, in certain embodiments, the only practical route for the transmission line is through the central bore of a downhole tool.

Nevertheless, routing the transmission line through the central bore may expose the transmission line to drilling fluids, cements, wireline tools, or other substances or objects passing through the central bore. This can damage the transmission line or cause interference between the transmission line and objects or substances passing through the central bore. Moreover, in directional drilling applications, downhole tools may bend slightly as a drill string deviates from a straight path. This may cause the transmission line to detach itself from the inside surface of the central bore, worsening the obstruction within the central bore.

Thus, what are needed are apparatus and methods to protect a transmission line, routed through the central bore of a downhole tool, from drilling fluids, cement, wireline tools, or other components traveling through the central bore.

What are further needed are reliable apparatus and methods to keep a transmission line attached to the inside surface of the central bore when the downhole tool bends from a linear path or when the transmission line encounters drilling fluids, cement, wireline tools, or other components traveling through the central bore.

SUMMARY OF INVENTION

In view of the foregoing, it is a primary object of the present invention to provide apparatus and methods for protecting a transmission line, routed through the central bore of a downhole tool, from drilling fluids, cement, wireline tools, or other components traveling through the central bore. If is a further object to keep a transmission line attached to the inside surface of the central bore when the downhole tool bends or deviates from a straight path or encounters objects or substances traveling through the central bore.

Consistent with the foregoing objects, and in accordance with the invention as embodied and broadly described herein, an apparatus for bonding a transmission line to the inside diameter of a downhole tool is disclosed in one embodiment of the invention as including a pre-formed interface for bonding a transmission line to the inside diameter of a downhole tool. The pre-formed interface includes a first surface that substantially conforms to the outside contour of a transmission line and a second surface that substantially conforms to the inside diameter of a downhole tool.

In selected embodiments, the first surface is shaped to mechanically grip the transmission line. In other embodiments, the first surface is bonded directly to the transmission line. For example, in selected embodiments, the first surface is bonded to the transmission line by adhesives or welding.

In selected embodiments, the first surface is configured to completely encircle or surround the transmission line. In other embodiments, the first surface only partially encircles or encompasses the transmission line. Like the first surface, in selected embodiments, the second surface is bonded to the inside diameter of the downhole tool using adhesives or welding.

The pre-formed interface may be pre-formed using various processes, including but not limited to extrusion, stamping, and casting processes. In selected embodiments, the pre-formed interface may be configured to engage one or several recesses or grooves milled or otherwise formed on the inside surface of the central bore.

In another aspect of the invention, a method for bonding a transmission line to the central bore of a downhole tool includes pre-forming an interface for bonding a transmission line to the inside diameter of a downhole tool. Preforming includes forming a first surface substantially conforming to the outside contour of a transmission line and forming a second surface substantially conforming to the inside diameter of a downhole tool. In addition, the method includes bonding the second surface to the inside diameter of the downhole tool.

In selected embodiments, the method also includes mechanically gripping the transmission line by the first surface. In other embodiments, the method includes bonding the first surface to the transmission line. For example, bonding may be achieved using adhesives or welding. In selected embodiments, the interface completely encircles or surrounds the transmission line. In other embodiments, the interface only partially encircles or surrounds the transmission line.

In selected embodiments, the method includes bonding the second surface to the inside diameter of the downhole tool using adhesives or welding. The method may also include pre-forming the interface using a method including but not limited to extruding, stamping, or casting. In selected embodiments, the interface may engage one or several recesses or grooves milled or otherwise formed on the inside surface of the central bore.

In another aspect of the invention, a method for bonding a transmission line to the inside diameter of a downhole tool includes positioning a transmission line near the inside wall of a downhole tool and placing a mold near the transmission line and the inside wall. The method further includes injecting a bonding material into the mold and curing the bonding material such that the bonding material bonds the transmission line to the inside wall.

After the bonding material is partially or completely cured, the method includes removing the mold from the bonding material. In selected embodiments, the method includes prepping the surface of either the inside diameter of the downhole tool, the transmission line, or both, before injecting the bonding material. To facilitate bending of the downhole tool, while preventing detachment of the transmission line from the inside surface, and to prevent large pieces of bonding material from detaching from the inside surface, the method may include forming gaps in the bonding material at desired intervals along the bonding material.

BRIEF DESCRIPTION OF DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings.

DETAILED DESCRIPTION

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Figure 1:
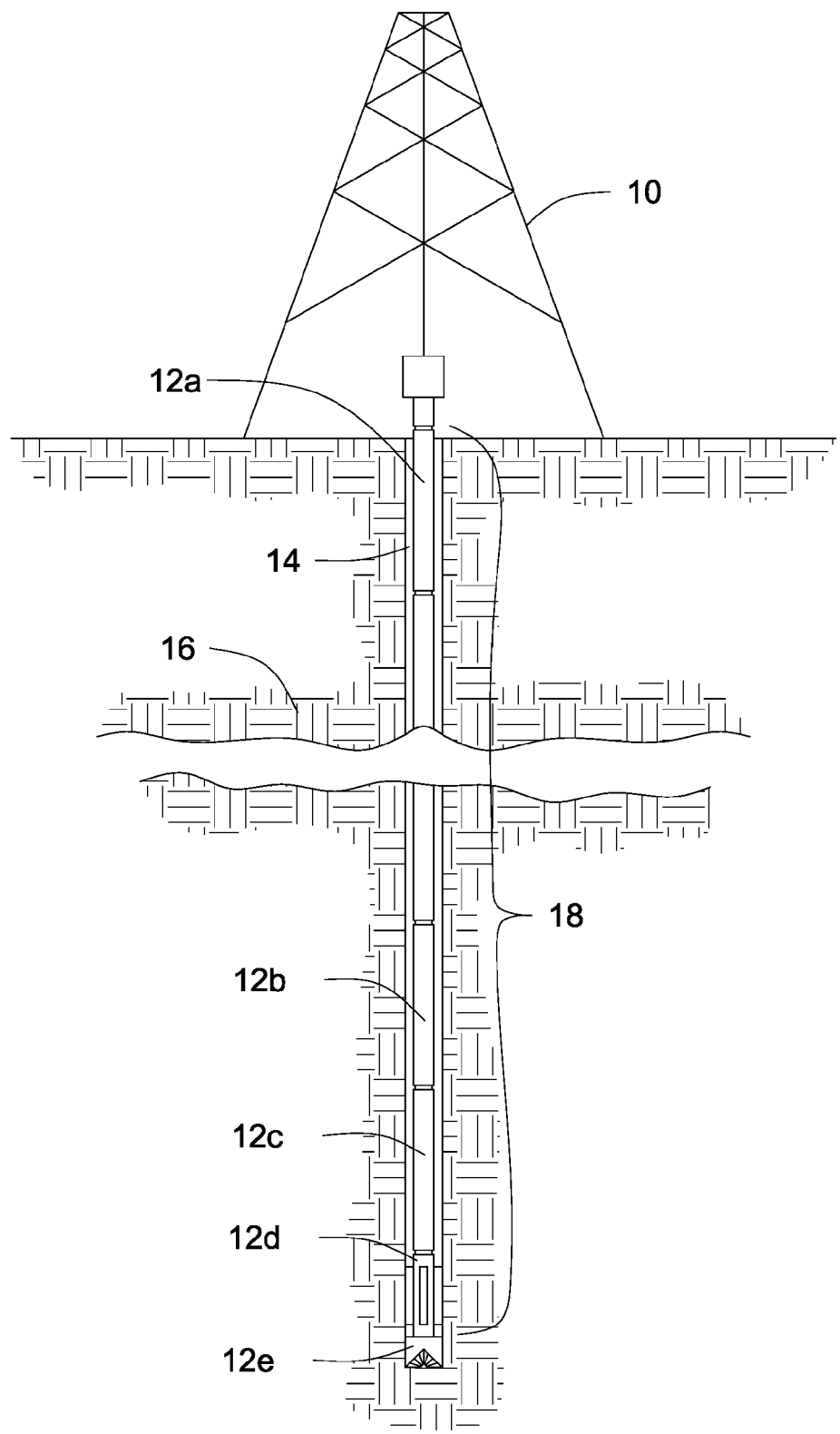
FIG. 1 is a cross-sectional view illustrating one embodiment of a drill rig in accordance with the invention.

Referring to FIG. 1, a cross-sectional view of a drill rig 10 is illustrated drilling a borehole 14 into the earth 16 using downhole tools (collectively indicated by numeral 12). The collection of downhole tools 12 form at least a portion of a drill string 18. In operation, a drilling fluid is typically supplied under pressure at the drill rig 10 through the drill string 18. The drill string 18 is typically rotated by the drill rig 10 to turn a drill bit 12e which is loaded against the earth 16 to form the borehole 14.

Pressurized drilling fluid is circulated through the drill bit 12e to provide a flushing action to carry the drilled earth cuttings to the surface. Rotation of the drill bit may alternately be provided by other downhole tools such as drill motors, or drill turbines (not shown) located adjacent to the drill bit 12e. Other downhole tools include drill pipe 12a and downhole instrumentation such as logging while drilling tools 12c, and sensor packages (not shown). Other useful downhole tools include stabilizers 12d, and tools such as hole openers, drill collars, heavyweight drill pipe, subassemblies, under-reamers, rotary steerable systems, drilling jars, and drilling shock absorbers as indicated by numeral 12*b*, which are all well known in the drilling industry.

Figure 2:
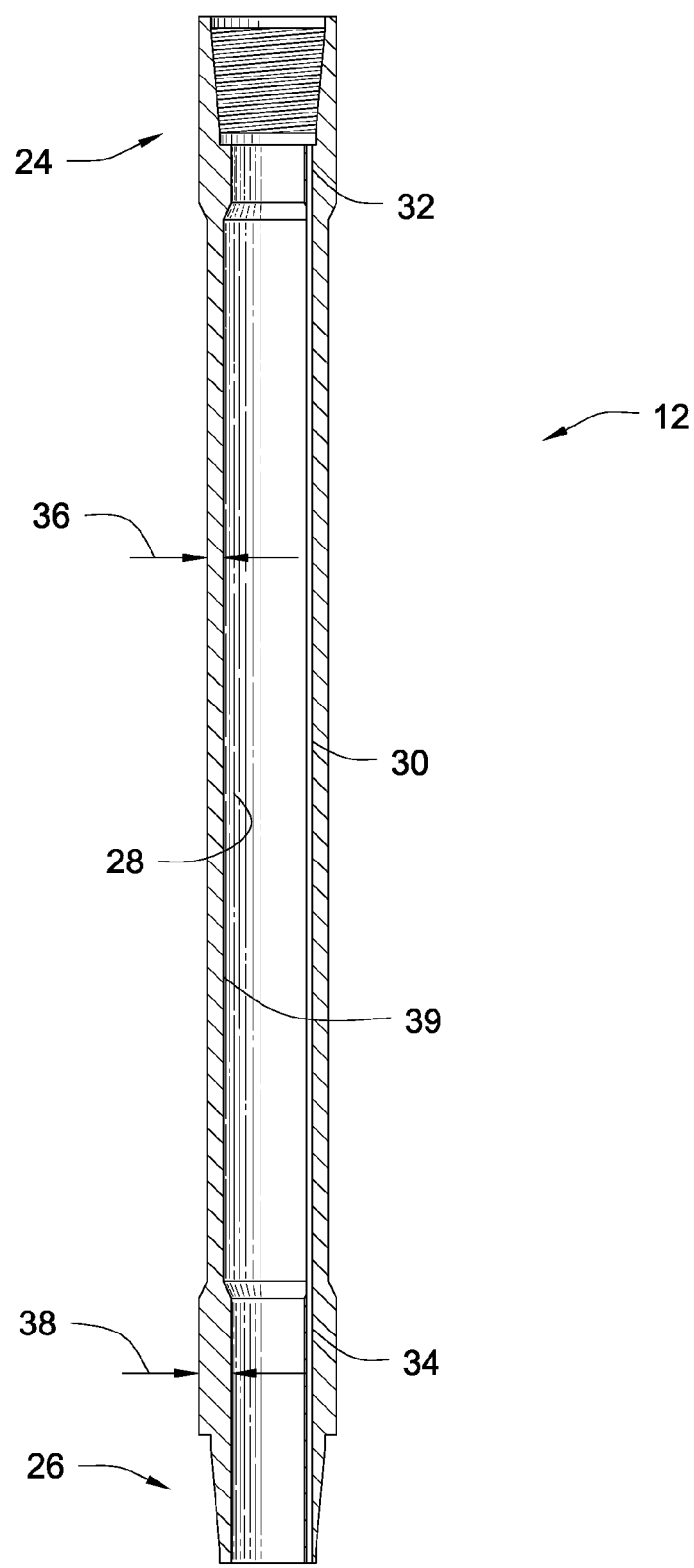
FIG. 2 is a cross-sectional view illustrating one embodiment of a transmission line integrated into a downhole tool.

Referring to FIG. 2, a downhole tool 12 may include a box end 24 and a pin end 26. A pin end 26 may thread into a box end 24, thereby enabling the connection of multiple tools 12 together to form a drill string 18. Due to the inherent nature of drilling, most downhole tools 12 have a similar cylindrical shape and a central bore 28. The central bore 28 is used to transport drilling fluids, wireline tools, cement, and the like through the drill string 18.

The thickness of the wall 36 surrounding the central bore 28 is typically designed in accordance with weight, strength, and other constraints, needed to withstand substantial torque placed on the tool 12, pressure within the central bore 28, flex in the tool 12, and the like. Because of the immense forces placed on the tool 12, milling or forming a channel in the wall 36 of the downhole tool 12 to accommodate a transmission line 30 may excessively weaken the wall. Thus, in most cases, the only practical route for a transmission line 30 is through the central bore 28 of the downhole tool 12.

Nevertheless, routing the transmission line 30 through the central bore 28 may expose the transmission line 30 to drilling fluids, cements, wireline tools, or other substances or objects passing through the central bore 28. This can damage the transmission line 30 or cause interference between the transmission line 30 and objects or substances passing through the central bore 28. Thus, in selected embodiments, a transmission line 30 is preferably maintained as close to the wall 36 of the central bore 28 as possible to minimize interference. In selected embodiments, the transmission line 30 is protected by a conduit 30 or other protective covering 30 to protect the internal transmission medium (e.g. wire, fiber, etc.).

As illustrated, at or near the box end 24 and pin end 26 of the tool 12, the central bore 28 may be narrower and the surrounding tool wall 38 may be thicker. This increases the strength of the downhole tool 12 at or near the tool joints, which undergo a great deal of stress during drilling. In addition, the added thickness 38 may enable channels 32, 34, to be milled or formed in the walls 38 to accommodate a transmission line 30 without overly weakening the tool 12. The channels 32, 34 may exit the downhole tool 12 at or near the ends of the tool 12, where the transmission line 30 may be coupled to transmission elements (not shown) to transmit information across the tool joints.

In an effort to tap into gas, oil, or other mineral deposits, a drill string 18 may bend from a linear path. Since a drill string 18 may consist of many hundreds of sections of drill pipe 12 and other downhole tools 12, the cumulative bend or curve in each tool 12 may enable a drill string 18 to bend from a vertical position to drill horizontally in some cases.

If a transmission line 30 is routed through the central bore 28 of a tool 12, the transmission line 30 may separate or detach from the inside surface of the central bore 28 when the downhole tool 12 bends. This may worsen the obstruction created by the transmission line 30 since it may interfere with fluids, wireline tools, concrete, or other objects or substances traveling through the central bore 28. In fact, in some cases, when a downhole tool 12, such as a section of drill pipe 12, bends significantly, the transmission line 30 may actually come into contact with the opposite side 39 of the central bore 28. Thus, apparatus and methods are needed to keep a transmission line 30 firmly attached to the inside diameter of the central bore 28 to prevent damage to the transmission line 30 and to minimize the obstruction within the central bore 28.

Figure 3:
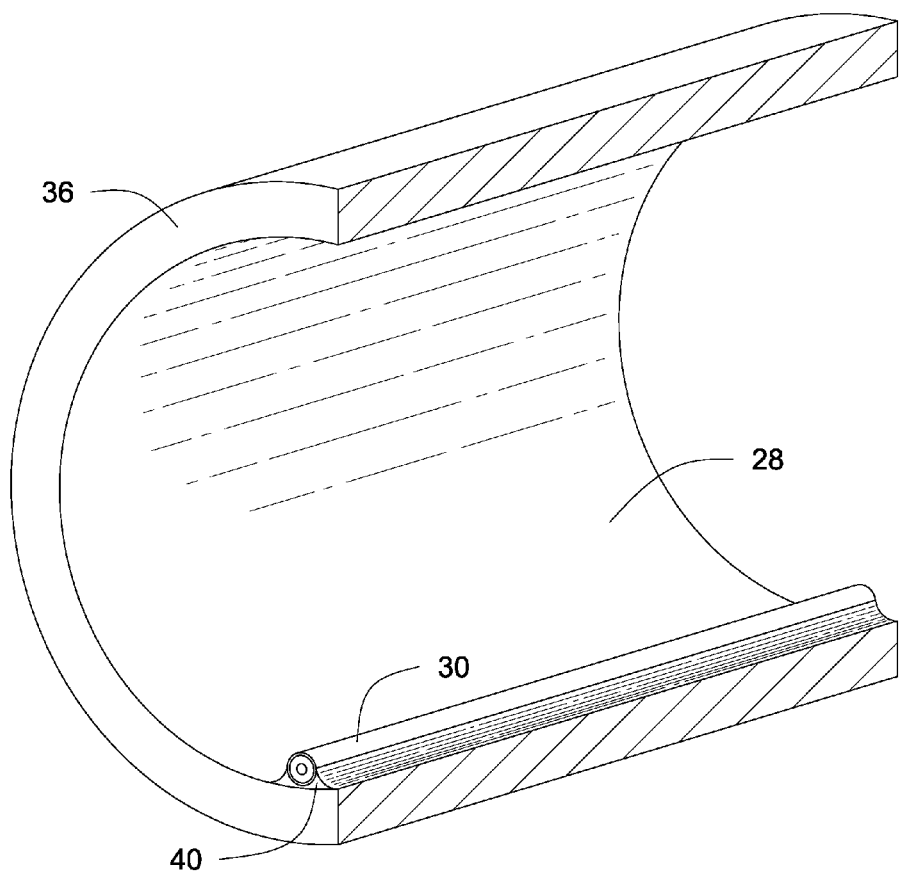
FIG. 3 is a cross-sectional view illustrating one embodiment of a pre-formed interface for mounting a transmission line to the inside diameter of a downhole tool.

Referring to FIG. 3, to keep the transmission line 30 attached to the inside of the wall 36 of the central bore 28, a pre-formed interface 40 may be attached to both the transmission line 30 and the central bore 28. The transmission line 30 may be a combination of some transmission medium, such as coaxial cable, copper wire, optical fiber, waveguides, or the like, and a protective covering such as sheathing or conduit. In selected embodiments, the conduit may be constructed of a metal such as stainless steel. By "pre-formed," it is meant that the interface 40 is formed previous to being inserted into the central bore 28, as opposed to being formed within the central bore 28 as an epoxy or other like material might be. Nevertheless, an alternative embodiment, where the interface 40 is actually formed in the central bore 28 with a material such as an epoxy, is described with respect to FIGS. 11 through 13.

The interface 40 may be used to enhance a bond between a transmission line 30 and the central bore 28 since the transmission line 30 may not naturally fit the contour of the central bore 28. The interface 40 may include a first surface that conforms to the contour of the transmission line 30 and a second surface that conforms to the inside surface of the central bore 28. The interface 40 need not exactly conform to the either the transmission line 30 or the central bore 28, although a close fit may be desirable in some cases.

In selected embodiments, surfaces of the central bore 28, the interface 40, the transmission line 30, or a combination thereof, may be roughened or prepped by sanding, grinding, etching, or some other method, before they are attached with adhesive or welded. Likewise, the transmission line 30, interface 40, and central bore 28 may be glued or connected together by any of various adhesives suitable for a downhole environment, or by welding, soldering, brazing, or the like.

The pre-formed interface 40 may be manufactured by any suitable means, such as by extrusion, casting, stamping, or the like, as will be described hereinafter. Since the pre-formed interface 40 may be configured to have a relatively constant cross-section, it may be desirable to use extrusion techniques to form the interface 40 since this process is relatively common and inexpensive.

Moreover, the interface 40 may be constructed of any suitable material having desirable strength and weight characteristics that is able to withstand the abrasion, temperature, and corrosive nature of a downhole environment. For example, the pre-formed interface 40 may be constructed of metals, such as aluminum or other alloys, or from plastics, composites, or the like. Some of these materials may be more suitable for downhole environments than others and some may be more suitable for manufacture by extrusion. Similarly, the interface 40 may be provided in various lengths, as desired. For example, the interface 40 may be a single continuous component extending most of the length of the downhole tool 12, or may be provided in any number of sections, as needed.

Figure 4A:
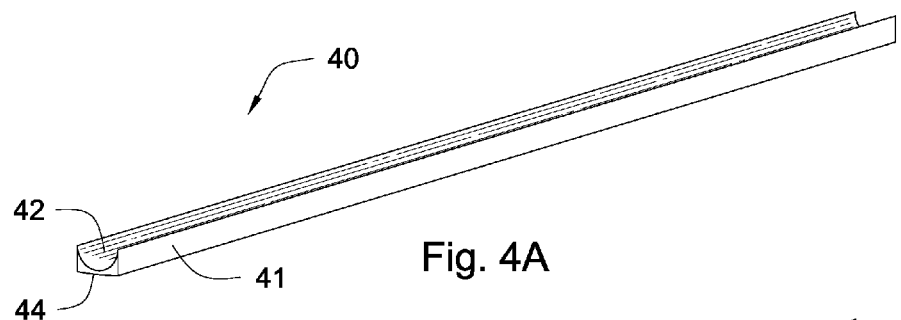
FIGS. 4A-4D are various perspective cross-sectional views illustrating several embodiments of pre-formed interfaces in accordance with the invention.
Figure 4B:
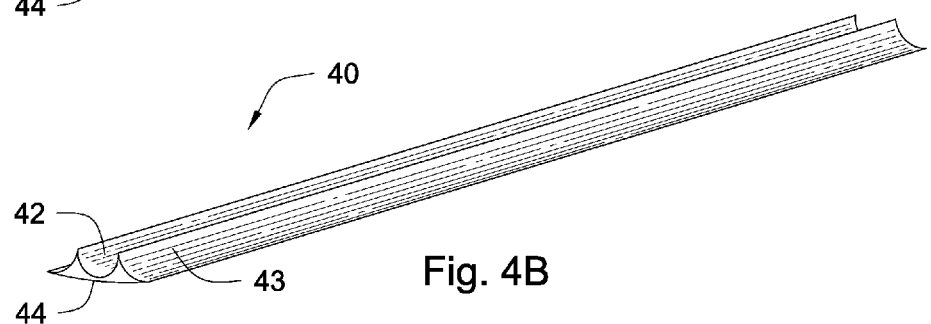
Figure 4C:
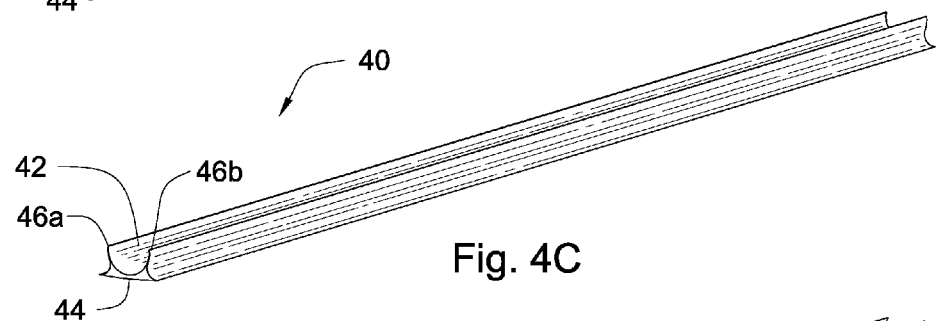
Figure 4D:
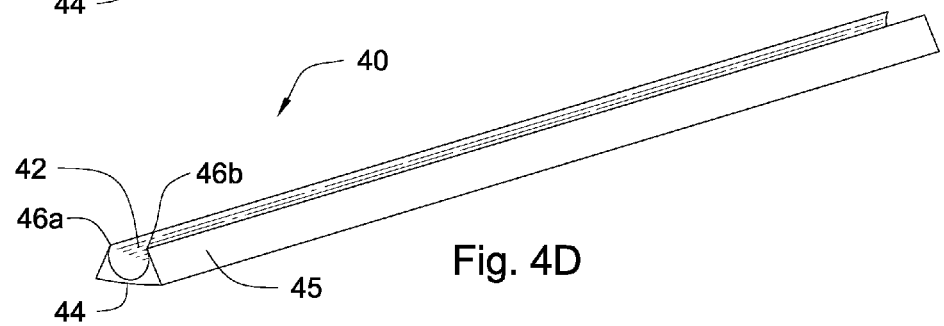

Referring to FIGS. 4A though 4D, various examples of pre-formed interfaces 40 are illustrated. For example, referring to FIG. 4A, a pre-formed interface 40 may include surfaces 42, 44 conforming to the transmission line 30 and central bore 28, respectively, and may have relatively straight, vertical sides 41. Likewise, referring to FIG. 4B, a pre-formed interface 40 may include sides 43 that slope outward. This may provide a wider surface 44 to provide greater contact and better adhesion to the surface of the central bore 28, in addition to providing added rigidity and strength to the interface 40. Referring to FIG. 4C, in other embodiments, the pre-formed interface 40 may be formed to include gripping features 46*a*, 46*b* that may reach around the transmission line 30, thereby providing a mechanical grip on the transmission line 30. Referring to FIG. 4D, likewise, a pre-formed interface 40 having gripping features 46a, 46b may include reinforced sides 45 to provide an improved mechanical grip on the transmission line 30.

Figure 5A:
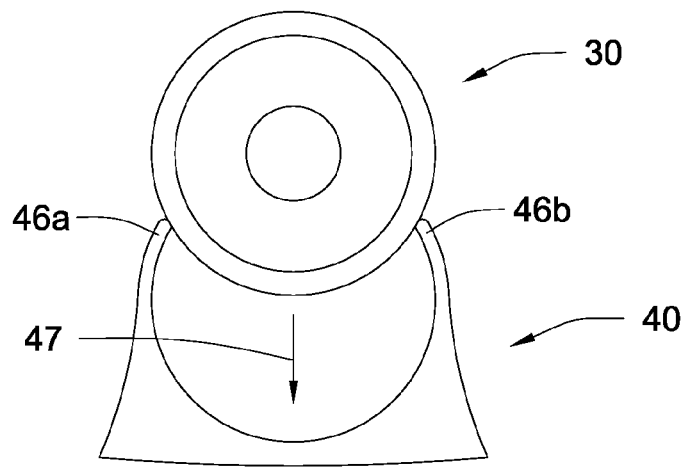
FIGS. 5A-5C are several cross-sectional views illustrating one embodiment of a pre-formed interface that mechanically attaches to a transmission line.
Figure 5B:
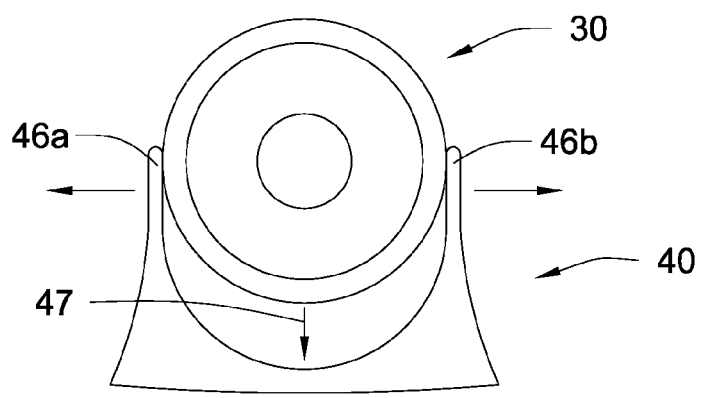
Figure 5C:
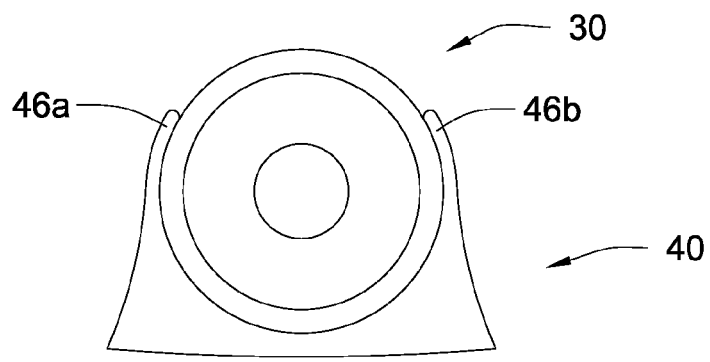

Referring to FIGS. 5A through 5C, various views of a pre-formed interface 40 providing a mechanical grip on a transmission line 30 are illustrated. As shown, the pre-formed interface 40 may have a solid cross-section. For example, referring to FIG. 5A, gripping features 46a, 46b may initially be too close together to receive a transmission line 30. Nevertheless, referring to FIG. 5B, as a force 47 is applied to the transmission line 30, the gripping features 46a, 46b may spread apart as the transmission line 30 is urged between the features 46a, 46b. The pre-formed interface 40 may be constructed of a material of sufficient elasticity and resiliency to flex or bend to accept the transmission line 30 without breaking or permanently deforming. Referring to FIG. 5C, after the transmission line 30 slips into the interface 40, the gripping features 46a, 46b may come together to mechanically grip and retain the transmission line 30.

Figure 6:
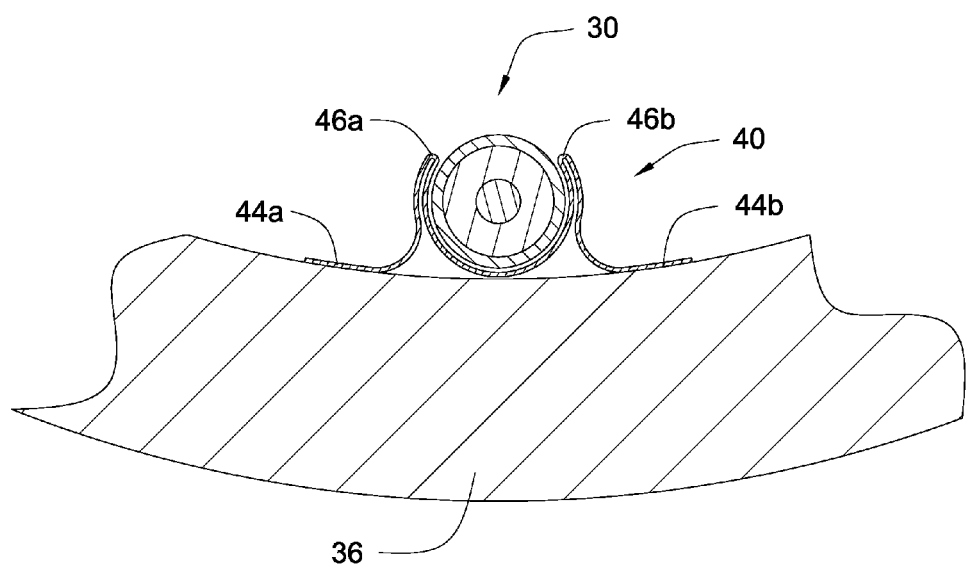
FIG. 6 is a cross-sectional view illustrating one embodiment of a pre-formed interface, mechanically attachable to a transmission line, that may be formed or stamped from a sheet-like material.

Referring to FIG. 6, in another embodiment, the pre-formed interface 40 may be constructed from a sheet-like material. Such a configuration may be created by stamping, bending, or extruding the material and may be sufficiently lightweight and resilient. The interface 40 may be formed to include mounting surfaces 44a, 44b to directly contact and attach to the wall 36 of the central bore 28. Likewise, the interface 40 may include gripping features 46a, 46b to mechanically grip and retain the transmission line 30. In selected embodiments, the interface 40 may closely fit the contour of the transmission line 30. This configuration may be desirable because the interface 40 may be attached to the inside wall of the central bore 28 before attaching the transmission line 30 to the interface 40. Likewise, the transmission line 30 may be removed or replaced without detaching the interface 40 from the central bore 28.

Figure 7A:
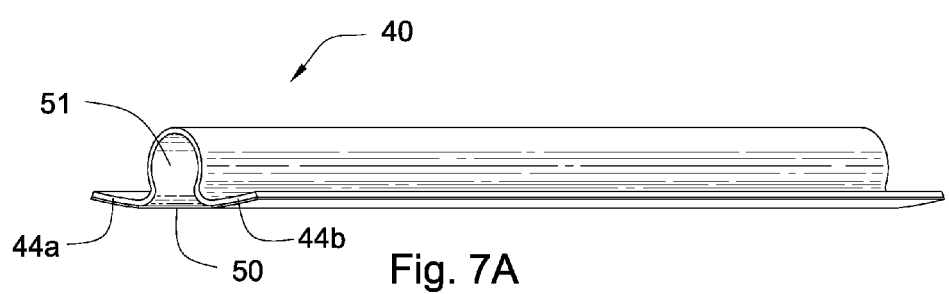
FIGS. 7A and 7B are cross-sectional views illustrating one embodiment of a pre-formed interface that substantially encloses a transmission line.
Figure 7B:
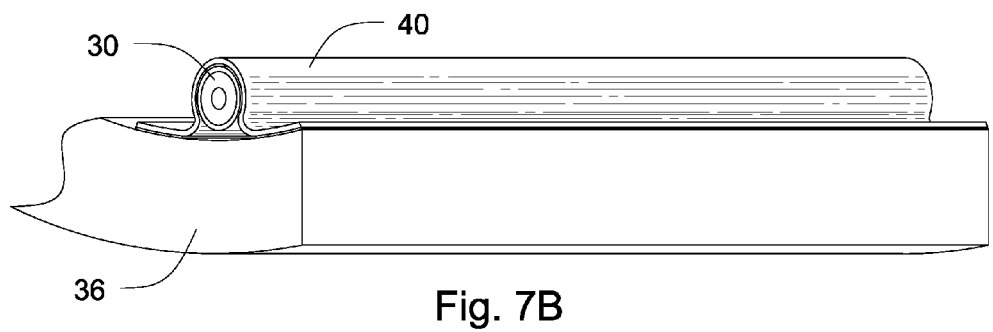

Referring to FIGS. 7A and 7B, in another embodiment, a pre-formed interface 40 may completely cover the transmission line 30. This configuration may, in some cases, be more reliable since the transmission line 30 will only detach from the inside wall of the central bore 28 if the interface 40 detaches from the central bore 28. In some cases, it may be possible to pre-attach the interface to the wall 36 and then feed the transmission line 30 through the opening 51. The interface 40 may optionally include a plate 50 or cover 50 to completely surround the transmission line 30. The interface 40 may also include surfaces 44a, 44b that may be formed to fit the contour of the wall 36.

Figure 8:
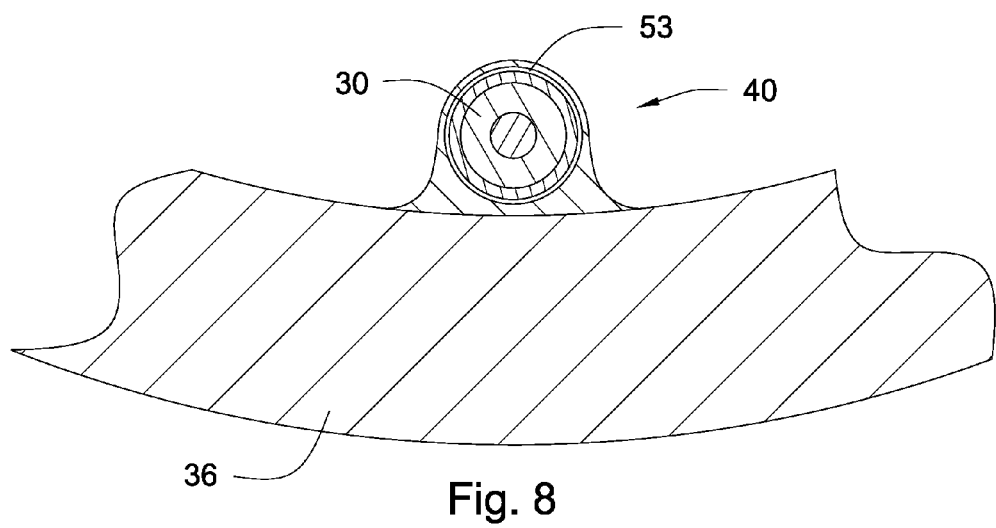
FIG. 8 is a cross-sectional view illustrating one embodiment of a pre-formed interface that completely encloses a transmission line.

Referring to FIG. 8, in another embodiment, a pre-formed interface 40 may form a closed channel 53 to accommodate the transmission line 30. A closed channel 53 may be useful to protect the transmission line 30 from drilling fluids or other substances present in a downhole drilling environment, and may prevent the detachment of the transmission line 30 from the wall 36 except in cases where the interface 40 itself detaches.

Figure 9:
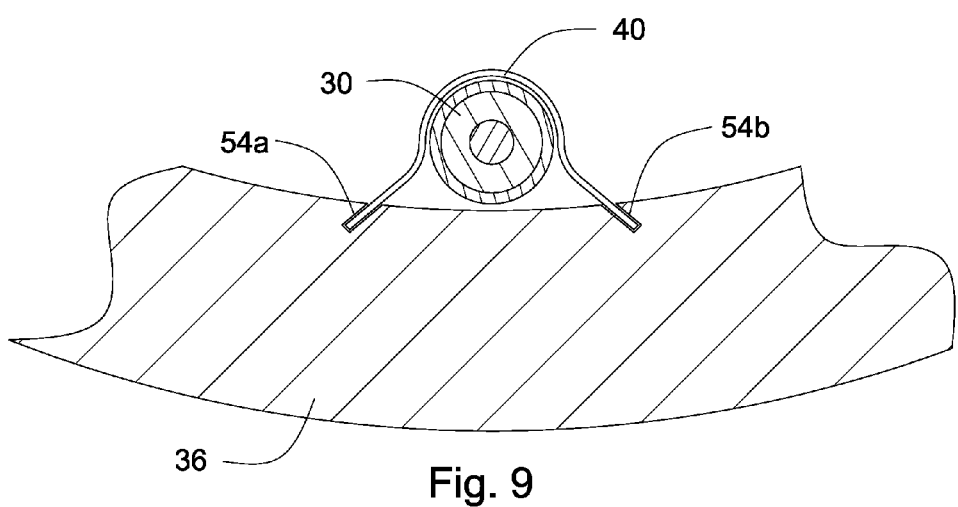
FIG. 9 is a cross-sectional view illustrating one embodiment of a pre-formed interface that engages one or several recesses or grooves formed along the inside surface of the central bore.

Referring to FIG. 9, in another embodiment, a pre-formed interface 40 may engage recesses 54a, 54b, or grooves 54a, 54b formed or milled into the wall 36. Since such grooves 54a, 54b or recesses 54s, 54b may weaken the wall, they may be very shallow, as needed, to minimize the weakening. Nevertheless, in some applications, such an embodiment may be precluded to keep the tool wall unaltered. In other applications, such as in tools having thicker walls, such grooves 54a, 54b, or recesses 54a, 54b, may provide an acceptable method for attaching an interface 40.

Figure 10:
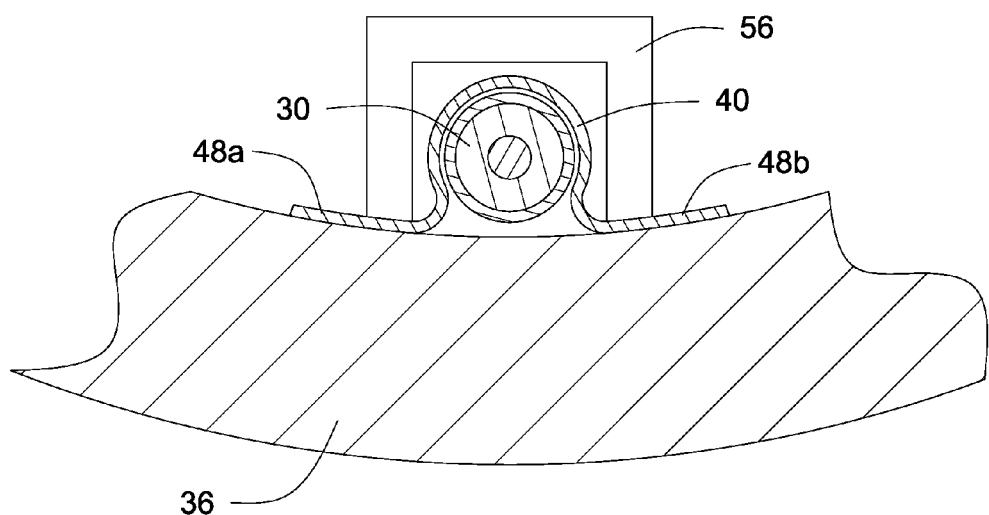
FIG. 10 is a cross-sectional view illustrating one embodiment of a tool used to attach the pre-formed interface to the inside surface of the central bore.

Referring to FIG. 10, to attach an interface 40 to the tool wall 36, a tool 56 may be used. As illustrated, a tool 56 may straddle the interface 40. Nevertheless, the tool 56 may take on many forms which may or may not straddle the interface 40 and the illustration is simply exemplary of a tool 56 that may be used in accordance with the invention.

For example, a tool 56 may press the surfaces 48a, 48b against the wall 36 while an adhesive is curing. Or, in other embodiments, a tool 56 may be used to heat or cool the interface 40 when adhering the interface 40 to the wall 36. In other embodiments, a tool 56 may be used to spot-weld the surfaces 48a, 48b to the tool wall 36. In some cases, heating or welding the interface 40 to the wall 36 may weaken the wall. Nevertheless, in other cases, a suitable weld may be applied by keeping the weld localized, sufficiently thin, or the like, such that the tool wall 36 is not critically weakened.

Figure 11:
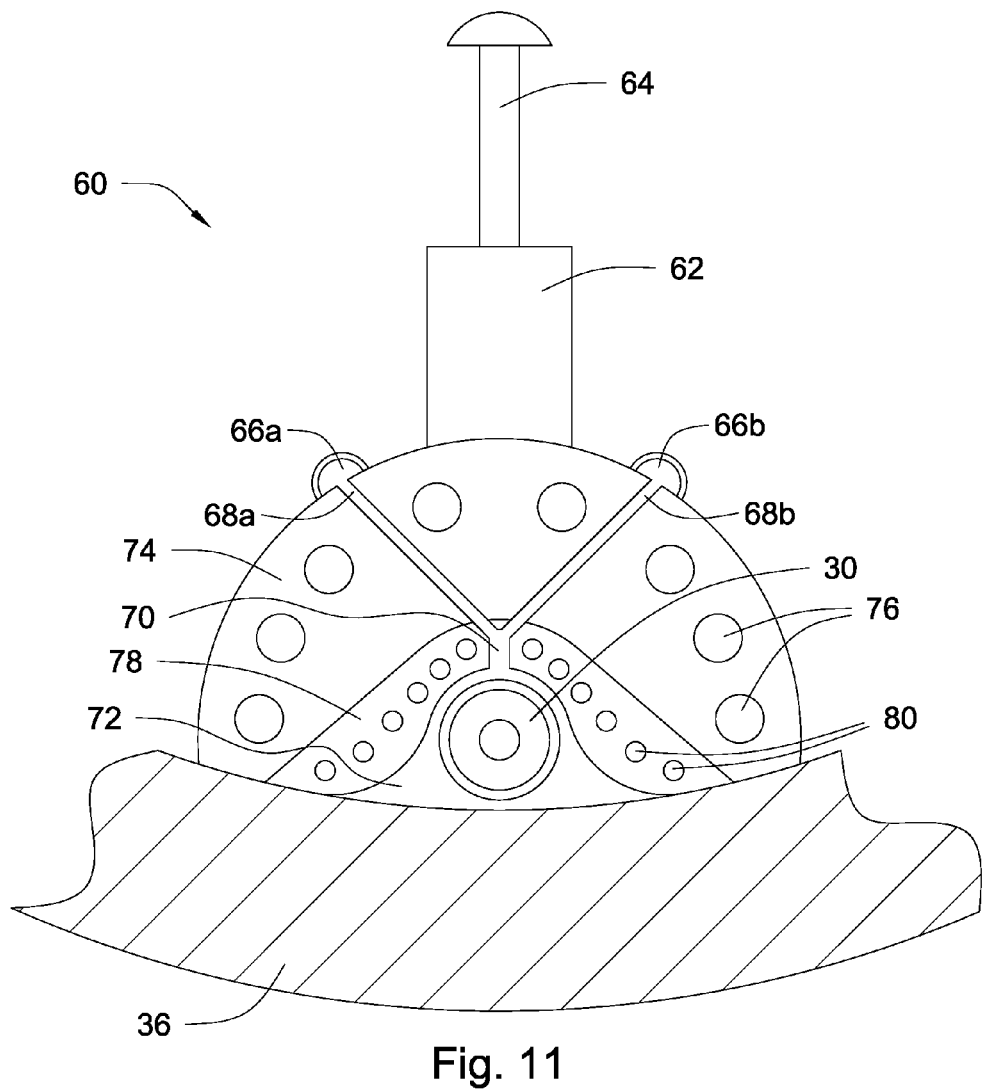
FIG. 11 is a cross-sectional view illustrating one embodiment of a mold assembly used to attach a transmission line to the wall of the central bore by applying a bonding material to the transmission line and inside diameter of the central bore.

Referring to FIG. 11, in another embodiment, a bonding material 72 (such as a high-temperature epoxy) may be formed or molded around the transmission line 30 to bond the transmission line 30 to the wall 36 of the central bore 28. To form the bonding material 72, a mold assembly 60 may be used to form the mold, inject, and cure the bonding material 72. For example, in one embodiment in accordance with the invention, a mold assembly 60 may include a clamping mechanism 62, 64 to press the mold against the wall 36. In one contemplated embodiment, the clamping mechanism 62, 64 may include a pneumatic or hydraulic cylinder 62 that exerts force against a plunger 64. The plunger 64 may contact the opposite side of the central bore 28 to keep the mold assembly 60 firmly positioned against the tool wall 36.

In selected embodiments, the mold assembly 60 may include one or several channels 66a, 66b to convey a bonding material 72 such as an epoxy. For example, a first channel 66a may be used to convey one part of an epoxy, and a second channel 66b may be used to convey a second part of the epoxy. When the two parts are mixed together, a curing reaction may be created wherein the epoxy cures or hardens. For example, the two parts of the bonding material 72 may travel through channels 68a, 68b to a mixing chamber 70 where the two parts may be mixed and injected around the transmission line 30.

In selected embodiments, the mold assembly 60 may include a mold 78 and a frame 74. The mold 78 may optionally include one or several heaters that may be used to heat the bonding material 72 to improve fluidity, help it cure, improve adhesion, or the like. Likewise, the frame 74 may optionally include one or several cooling channels 76 to rapidly cool the bonding material 72 or provide other functions.

Figure 12:
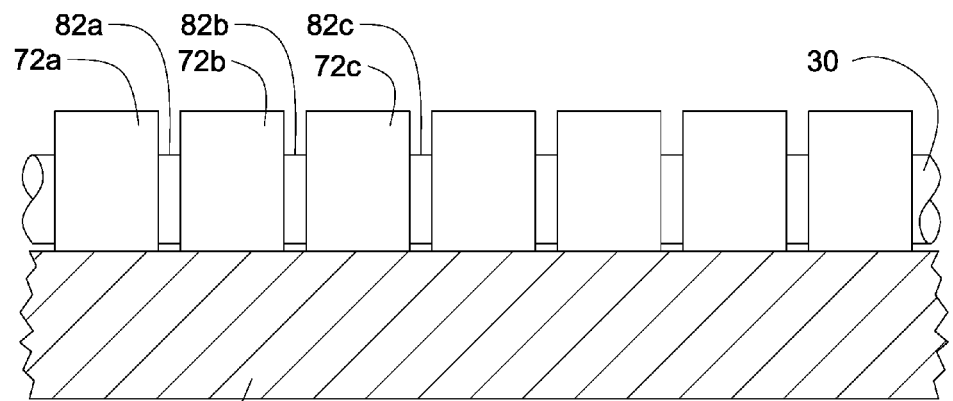
FIG. 12 is a cross-sectional view illustrating air gaps that may be formed at desired intervals along the bonding material to allow bending of a downhole tool while preventing detachment of the transmission line from the central bore, and to prevent large pieces of bonding material from detaching from the inside surface of the central bore.

Referring to FIG. 12, in selected embodiments, a bonding material 72a, 72b, 72c may be configured to include one or several air gaps 82a, 82b, 82c. One concern in downhole drilling applications is that long strips of a bonding material 72, such as an epoxy, may detach or peel away from the tool wall 36. Such pieces or strips may be carried downhole where they may clog or interfere with jets or other devices carrying drilling fluids, such as drilling mud. The air gaps 82a, 82b, 82c may help ensure that pieces of bonding material 72 that peel away remain small such that they do not detrimentally damage or clog other downhole tools 12. Likewise, as was previously mentioned, in some cases, a drill tool 12 may bend from a linear path. The air gaps 82 may improve the adhesion of the bonding material 72 to the tool wall 36 in instances where a drill tool 12 bends by relieving stress in the bonding material 72 that may cause it to sheer or peel away from the tool wall 36.

Figure 13:
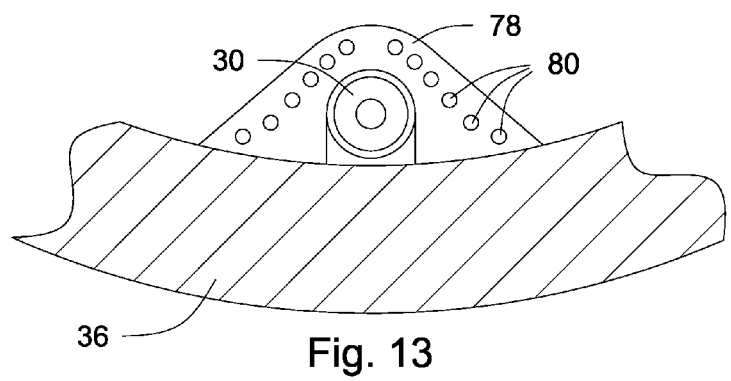
FIG. 13 is a cross-sectional view illustrating one embodiment of a mold assembly used to form the air gaps described in connection with FIG. 12.

Referring to FIG. 13, to form the air gaps 82 illustrated in FIG. 12, a modified mold 78 may be used in the mold assembly 60 in areas where air gaps 82 are inserted. For example, a modified mold 78 may be configured to closely straddle the transmission line 30 in areas of the air gaps 82 to prevent bonding material 72 from entering those areas 82. Like the mold 78 illustrated in FIG. 11, the modified mold 78 may include one or several heating elements 80 or cooling conduits 80 to either heat or cool the bonding material 72, as needed.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

The invention claimed is:

1. A method for bonding a transmission line to the inside diameter of a downhole tool, comprising the steps of:
    positioning a transmission line near the inside wall of a downhole tool;
    positioning a mold near the transmission line and the inside wall;
    injecting a bonding material into the mold such that the bonding material bonds the transmission line to the inside wall;
    curing the bonding material; and
    removing the mold from the bonding material.

2. The method of claim 1, further comprising prepping the surface of at least one of the inside wall, and the transmission line, before injecting the bonding material.

3. The method of claim 2, wherein the step of prepping includes sanding, grinding, etching, or combinations thereof.

4. The method of claim 1, further comprising forming gaps in the bonding material at desired intervals along the bonding material.

5. The method of claim 1, wherein the downhole tool is selected from the group consisting of drill pipe, hole openers, drill collars, heavyweight drill pipe, sub-assemblies, under-reamers, rotary steerable systems, drilling jars, drilling shock absorbers, and combinations thereof.

6. The method of claim 1, wherein the transmission line comprises a protective covering.

7. The method of claim 6, wherein the protective covering is made of stainless steel.

8. The method of claim 1, wherein a portion of the transmission line is disposed within a channel formed near an end of the downhole tool.

9. The method of claim 1, wherein the transmission line is a coaxial cable, copper wire, optical fiber, waveguide or combination thereof.

10. The method of claim 1, wherein the step of positioning a mold near the transmission line and the inside wall includes pressing the mold against the wall with a clamping mechanism.

11. The method of claim 10, wherein the clamping mechanism is a pneumatic or hydraulic cylinder.

12. The method of claim 1, wherein the mold comprises a heating element.

13. The method of claim 1, wherein the mold comprises a cooling channel.

14. The method of claim 1, wherein the mold completely encircles the transmission line.

* * * * *